June 2, 1931.  A. J. THIBAULT  1,807,944
BURGLAR TRAP
Filed April 24, 1929
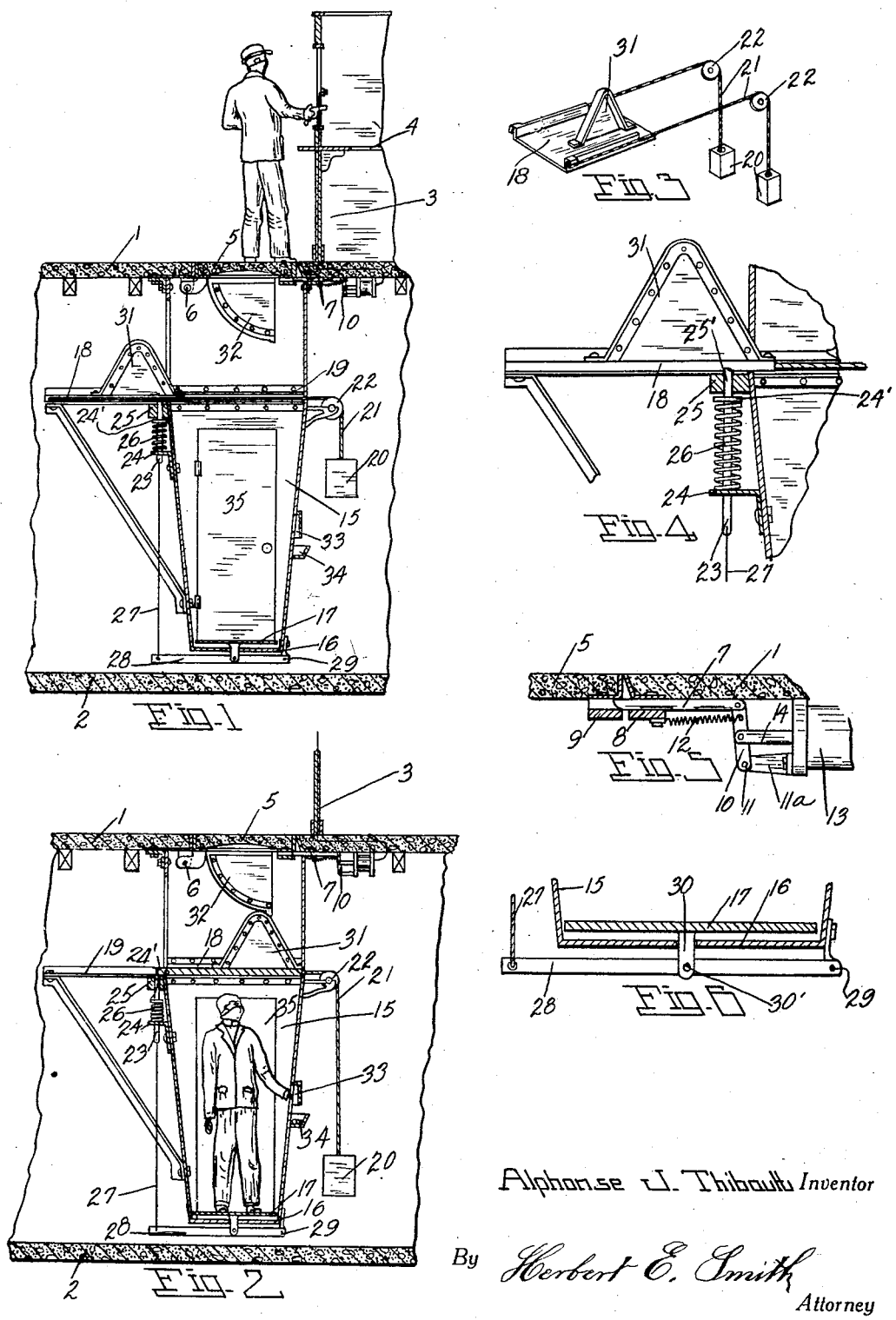
Alphonse J. Thibault Inventor
By Herbert E. Smith
Attorney Patented June 2, 1931

1,807,944

UNITED STATES PATENT OFFICE

ALPHONSE J. THIBAULT, OF HARRISON, IDAHO

BURGLAR TRAP

Application filed April 24, 1929. Serial No. 357,678.

My present invention relates to an improved burglar trap designed for the purpose of catching burglars, thieves, hold-up men and others, temporarily imprisoning them, and for preventing their escape. The trap appliance is particularly designed for use in banks and similar places adjacent to the cashier's cage or counter, and is electrically operated by a switch under control of the cashier. The appliance includes a trap door in the main floor of the bank located directly above an imprisoning cage or trap, and the door is adapted to be dropped from set position to plunge the burglar into the trap or cage. The top of the cage or trap is normally open, and a horizontally slidable door or closure for the trap is automatically closed by the weight of the burglar after he is plunged into the trap. The sliding movement of the automatically operated slide door is instrumental in restoring the trap door, in the main floor, to normal set position flush with the main floor.

The invention consists in certain novel combinations and arrangements of parts constituting the appliance, and in the operating mechanism for these parts, as will hereinafter be more fully set forth and claimed.

In the accompanying drawings I have illustrated one complete example of the physical embodiment of my invention wherein the parts are combined and arranged, and operated, according to the best mode I have thus far devised for the practical application of the principles of my invention.

Figure 1 is a vertical sectional view of a portion of a bank or other building structure in which the trap is installed, and set in position for operation, and Figure 2 is a similar view showing the parts after the trap has been operated and the burglar imprisoned. Figure 3 is a perspective view of the slide door for the trap, showing its operating weights. Figure 4 is a detail view partly in section showing the lock for holding the slide door in open position. Figure 5 is a detail view of the fastening bolt and operating means for the trap door. Figure 6 is a view showing the false bottom of the trap or cage and the operating lever actuated by the weight of the burglar on the false bottom for releasing the weight operated slide door.

The main floor of a bank building or other structure is indicated by the numeral 1 and a sub-floor or basement floor is denoted by the numeral 2. The usual cashier's cage or bank teller's cage is indicated by the numeral 3 and the counter or shelf for convenience in handling money is designated 4.

In the main floor, in front of the cashier's window, an opening is provided, said opening being normally closed by the trap door 5, that is hinged at 6 beneath the floor, and the trap door as shown, is normally flush with the main floor when the trap is set. The trap door is supported in normal closed position by one or more slide bolts 7 carried at the underside of the floor in a housing or sleeve 8 and projected into a keeper-sleeve or bushing 9, carried near the free edge of the door and at its under side. A bolt-releasing lever 10 is pivoted at the rear end of the bolt, and pivotally supported at 11 on a bracket 11a, and a spring 12 anchored at one end to the housing 8 and at its other end to the lever 10, normally holds the bolt projected into the keeper 9 for supporting the door in closed position. For releasing the slide bolt from its keeper I employ an electric solenoid 13 having its core 14 pivotally connected to the lever 10 and an operating switch, conveniently located for access for the cashier or teller is included in the electric circuit with the solenoid. With the burglar in position of Figure 1, when the control switch is closed, through the operation of the solenoid, the slide bolt (or bolts) is withdrawn from its keeper, and the weight of the trap door, together with the weight of the burglar, cause the trap door to swing down on its hinges, and plunge the burglar into the cage or trap 15.

The cage or trap 15 as shown is provided with closed walls and a bottom 16, the latter slightly elevated above the sub-floor 2, and within the lower part of the cage a false bottom 17 is supported, free of the bottom 16 and slightly elevated above it.

The false bottom is designed for use in releasing the fastening device that normally holds open a slide door 18 which is movable in a pair of grooved guides 19 located above the trap and disposed in horizontal position. The slide door is operated in its sliding or closing movement through the action of a pair of suspended weights 20 carried at the ends of a pair of cables 21 that pass over guide pulleys 22, near the top of the cage, and attached at the front edge of the slide door.

For fastening the slide door and retaining it in normal open position, I utilize a vertically disposed spring bolt 23 carried in guides 24 and 25 secured to one of the side walls of the trap near its upper edge, and a spring 26 coiled about the bolt and interposed between the lower guide bracket 24 and a collar 24' fixed on the bolt, is instrumental in projecting the bolt into a recess 25' of the slide door. When the slide bolt is released or withdrawn from the recess, the weights 20 are designed to slide the door from open position in Figure 1 to the closed position of Figure 2 thus trapping the burglar in the cage.

The slide door is released, and then closed, after the burglar has been plunged into the cage or trap, and the release of the door is accomplished by the weight of the burglar as he falls on the false bottom 17. For this purpose the slide bolt 23 is provided with a pull cable 27 that extends downwardly and is attached to the free end of a release lever 28 located between the bottom of the cage and the sub-floor 2. The lever extends under the bottom of the cage, and at 29 is pivoted below the cage, an arm 30 being secured on the false bottom and pivoted at 30' to the lever between its free end and its pivot. The arm projects through an opening in the bottom 16 of the cage, and it will be apparent that when the weight of the burglar depresses the false bottom 17, the free end of the lever will be depressed, the cable pulled, and the spring bolt will be withdrawn from its recess, thus freeing the slide door and permitting the weights to close it over the head of the burglar.

By the closing movement of the slide door the trap door is reset and restored to normally closed position flush with the floor 1. For this purpose an angular, door-closing yoke 31 is carried on the top of the slide door, and as the door slides to closed position, the yoke contacts and frictionally engages a curved cam arm 32 carried in the path of the yoke at the underside of the trap door. As the angular face of the yoke rides under the curved face of the cam arm, the arm and the door are swung upwardly on the hinges 6, to the position in Figure 2. In this manner the opening in main floor 1 is immediately closed by the upward swing of the trap door, and the latter is held in normal closed position by the co-action of the yoke and arm, until the trap is re-set.

In one wall of the cage or trap a sheathed slot 33 is provided, through which the burglar is required to pass his weapons, and a pocket 34 is provided on the exterior face of the wall below the sheathed slot for the reception of the weapons.

After the burglar has been dispossessed of his weapons he may be permitted to exit from the cage after an emergency door 35 is opened, and the burglar is of course captured.

Before the slide door is opened, the spring pressed slide bolt 7 is projected to position for fastening the trap door, and the slide door may then be manually opened. The spring pressed bolt 23 automatically engages the recess in the opened slide door, and the spring 26 lifts the false bottom 17 to elevated position for re-setting the release mechanism of the vertically slidable bolt.

Having thus fully described my invention, what I claim as new and desire to secure by Letters Patent is:—

1. In an appliance as described, the combination with a trap having a depressible, false bottom, of a weight operated slide door for the upper open end of the trap, a spring pressed slide bolt for holding the door in open position, a release lever operated by the depressible false bottom, and a pull cable connecting the lever and said bolt.

2. In a trap appliance, the combination with a hinged trap door, and release means therefor, of a normally open, weight operated slide door, means for fastening the slide door and releasing means therefor, and co-acting means on the two doors for closing the trap door as the slide door closes.

3. In an appliance as described the combination with a hinged trap door having a cam arm thereon, means for fastening the door in closed position and release means therefor, of a weight-operated slide door having a yoke thereon for frictional engagement with the arm, means for retaining the slide door in open position and means for releasing the retaining means.

In testimony whereof I affix my signature.

ALPHONSE J. THIBAULT.